Sept. 7, 1965 J. W. VAN NATTER 3,205,155

METHOD OF FABRICATING THIN FILM RESISTIVE ELEMENTS

Filed Oct. 19, 1961

INVENTOR.
John W. van Natter

BY Mueller & Aichele

ATT'YS.

United States Patent Office 3,205,155
Patented Sept. 7, 1965

3,205,155
METHOD OF FABRICATING THIN FILM RESISTIVE ELEMENTS

John W. van Natter, Scottsdale, Ariz., assignor to Motorola, Inc., Chicago, Ill., a corporation of Illinois
Filed Oct. 19, 1961, Ser. No. 146,201
3 Claims. (Cl. 204—130)

Figure 1:
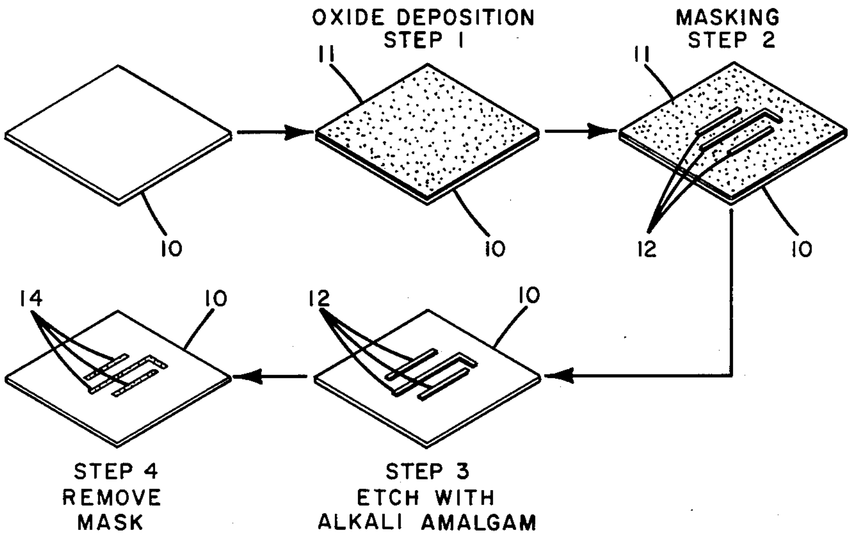

This invention relates to the microelectronics art, and particularly to the fabrication of microminiature resistance elements from a thin electrically conductive film formed on a substrate.

In microelectronics systems, the functions of conventional circuit elements such as resistors, capacitors, inductors, transistors and the like are integrated into a composite structure which in some cases is smaller than an ordinary match folder. Some of these electrical functions can be performed by materials deposited on a substrate in the form of thin films, and these deposits may be interconnected with each other and with other circuit functions to provide complete electrical systems in an integrated structure.

Resistance elements for such microelectronics systems have been successfully fabricated from thin films of electrically conductive metal oxide materials, particularly tin oxide. The film can be formed by deposition from vapors, and pyrolytic deposition processes have been found to be advantageous from the standpoint of producing films with the desired electrical and physical properties.

The final thin film resistance element must be of a particular size and shape, and considerable difficulty has been encountered in defining the deposits as to size, configuration and position while maintaining the desired physical and electrical properties of the oxide material. The best results have been obtained by depositing a continuous metal oxide film on a substrate and then removing undesired portions of the film by etching. The portions of the film which form the final resistance elements are protected by a masking coating during the etching.

The etching of a metal oxide film such as tin oxide has typically been accomplished by reacting hydrochloric acid and a metal such as zinc or magnesium at the tin oxide surface to generate nascent hydrogen which reduces the tin oxide to tin. This method is time consuming, and perhaps even more important, the hydrogen tends to attach the film material underlying the protective mask as well as the exposed portions of the film. This often produces discontinuities called "pinholes" in the film which remains on the substrate, and as a result, yields of acceptable film resistors have been undesirably low.

An object of the present invention is to improve the process just referred to for fabricating film resistance elements by providing a new treatment for removing metal oxide film material from a substrate.

Another object of the invention is to provide a method of removing unwanted metal oxide film material from a substrate by etching such that portions of the film that are protected with masking material are not adversely affected by the etching agent.

A feature of the invention is the removal of metal oxide material from a substrate with a mercury amalgam containing a reducing metal which accomplishes the removal quickly without adversely affecting masked portions of the film.

Another feature of the invention is the continuous charging of mercury with a metal by electrolysis to facilitate the etching of resistive films with the metal-mercury amalgam to form microminiature resistance elements.

Figure 2:
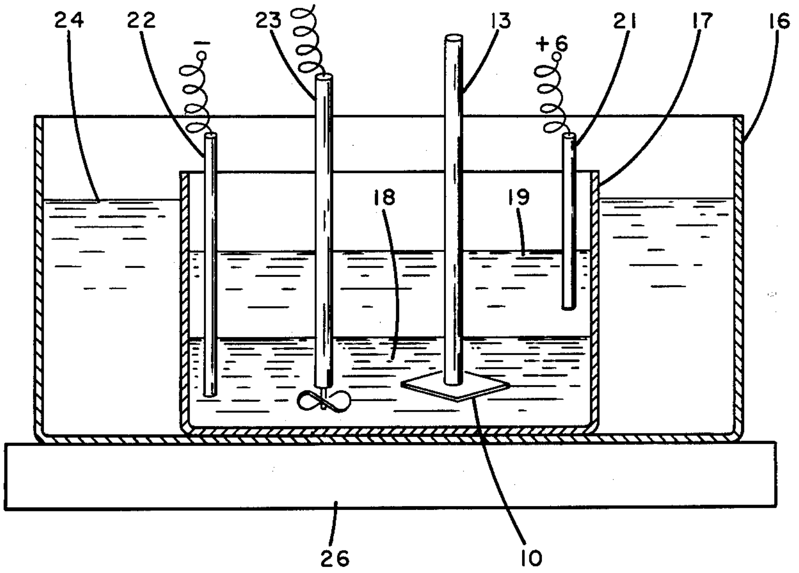

The invention is illustrated in the accompanying drawings in which:

FIG. 1 is a flow diagram illustrating the main steps of a process of fabricating thin film resistance elements in accordance with the invention; and FIG. 2 is a schematic view in section of an electrolytic cell in which the etching step of the process of Fig. 1 is carried out.

The invention provides an improved process for fabricating microminiature film resistors at high production rates with a considerable increase in the yield of satisfactory units. The lower yields experienced with previously known processes have been caused largely by degradation of the metal oxide film material in the etching step which is performed to define the desired resistive configuration. Such degradation has been eliminated or reduced to negligible proportions by an improved etching treatment using an amalgam of mercury charged with alkali metal or alkaline earth metal as an etching agent. The amalgam may be prepared from low cost salt solutions by electrolysis in a manner which continuously charges the mercury with the selected metal. Any number of substrates may be etched at one time, and complete removal of unwanted film material from the substrate takes place in a few minutes as compared to the requirements for as much as three hours of continuous etching with acid solutions in accordance with known processes. The amalgam does not attack portions of the film underlying protective masking material, and the resulting resistance film which remains after etching is comparatively free of defects such as pinholes which often result from etching with acid solutions.

A flow diagram for the process is shown in FIG. 1. First, a suitable substrate 10 is provided, and substrates of vitreous or ceramic material have been found to be satisfactory. The nature of the substrate depends to a great extent upon what electrical functions are to be fabricated on it, and it is possible to build very complex electrical systems on an extremely small substrate. Since the present invention is concerned with the fabrication of thin film resistance elements, a very simple structure has been shown in FIG. 1, but it will be understood that more complex structures are completely feasible.

The substrate 10 is cleaned and otherwise processed to put it in proper condition to receive a metal oxide film on its surface. The metal oxide material is deposited on the substrate in step 1 to form an electrically conducting film 11 on the surface of the substrate. Preferably the film 11 is of tin oxide material ($SnO_2$). The deposition may be accomplished by pyrolysis of tin chloride ($SnCl_4$) in liquid vapor form. The film 11 typically has a thickness of about 1 x $10^{-5}$ cm., and its electrical resistivity may be in the range from about 3,000 to about 7,000 ohms per square.

After the film 11 has been formed on the substrate, masking material is applied to the film to provide a protective coating over those portions of the film which are to be the final resistance elements. The masking operation is step 2 in the flow diagram of FIG. 1, and the final masked areas on the film are identified 12. Many suitable masking materials are available, but since the areas which are to be masked usually are extremely small, the best results have been obtained using photoengraving resist materials. Such materials may initially be applied continuously over the entire film 11, and then unwanted portions of the resist material are removed to form a pattern of resist. The portions 12 of the resist are selectively exposed to ultraviolet light through a pattern which protects the remainder of the resist from exposure. A developing solution is then applied to the resist, and it dissolves the unexposed resist material leaving the portions 12 on the film 11.

The substrate 10 with the masked film 11 on it is etched with an amalgam in step 3 of the process in order to remove from the substrate those portions of the film 11 which are not protected by the resist material 12. The etching step can be accomplished satisfactorily in an electrolytic cell of the type shown schematically in FIG. 2, and it may be seen from FIG. 2 that the substrate is attached to a holder 13 and is immersed in a pool of a reducing amalgam material at the bottom of a container. The exposed portions of a film 11 of tin oxide are completely removed after a few minutes of immersion in the amalgam. Although this immersion technique represents a practical way of accomplishing the etching, there are other satisfactory ways of applying the amalgam to the film 11 such as by pouring or by spraying the amalgam on to the substrate, for example.

Following the etching step, the masking material may be removed from the substrate (step 4), and the final resistance elements 14 are then exposed as shown in FIG. 1. Such resistance elements may be interconnected with each other and with other thin film circuit functions by means of metallic deposits on the substrate material.

FIG. 2 illustrates an electrolytic cell in which the etching step 3 of FIG. 1 may be carried out. The cell includes an outer container 16 and an inner container 17. There is a pool of mercury 18 at the bottom of the inner container 17, and the mercury is charged with an alkali metal or an alkaline earth metal from an aqueous solution 19 of an ionizable compound of the selected metal. The solution floats on top of the mercury pool. An anode 21 extends into the solution 19, and a cathode 22 extends into the mercury pool 18. The mercury is stirred by means of an agitator 23. Water 24 is provided in the space between the two containers 16 and 17, and the cell is heated by means of a suitable heater 26 which is shown schematically.

Suitable alkali metal compounds which may be used in the solution 19 are sodium hydroxide, sodium chloride, potassium hydroxide or potassium chloride. Suitable alkaline earth metal compounds are magnesium hydroxide and calcium hydroxide. The other metals in the alkali and alkaline earth groups can be used, but the best results have been obtained with the materials just referred to. A potential of about 6 volts is applied across the anode and cathode of the cell, and an electrolytic reaction takes place in the cell. If a sodium compound is used in the solution 19, the cathode half reaction can be expressed as follows:

$$Na^{+}+e^{-}\rightarrow Na$$

The sodium metal produced by this reaction is trapped in the mercury pool 18, and thus the mercury becomes charged with sodium. Other alkali metals and alkaline earth metals will exhibit the same behavior. The free metal in the mercury pool acts as a strong reducing agent on the oxide film 11 when the filmed substrate is introduced into the mercury pool as described above. If the film 11 is of tin oxide, the oxide is reduced to metallic tin according to the following half recation:

$$Sn^{+4}+4e^{-}\rightarrow Sn$$

The exposed portions of the film 11 on the substrate 10 are completely reduced in a matter of 2 or 3 minutes, and the elemental tin is transferred to the mercury. Thus, one of the advantages of the processing is the short time required to accomplish the etching. There are several other advantages of importance. There has been no tendency for the amalgam to produce pinholes in the portions of the film 11 underlying the resist 12, and this eliminates a difficult problem which has been encountered with other etching techniques. The electrolytic tank may be made as large as desired in order to accommodate a relatively large number of substrates at one time. Most of the materials used are not expensive, and the only expensive items, mercury and platinum electrodes, are not consumed in the process. The mercury may be purified by distillation and reused. The cell may be operated for fairly long periods of time requiring only very small additions of the metal compound and water. Periodically the cell may be dismantled and cleaned. The electrolyte solution 19 serves as an effective barrier to mercury vapors, so there is no hazard from such vapors. A relatively small amount of hydrogen is evolved from the cathode, and this may be conveniently vented with a standard hood. Thus, the invention provides an economical way of accomplishing the etching of metal oxides, and can be applied effectively to the fabrication of microminiature thin film resistance elements.

I claim:

1. A process for making a device comprising a predetermined electrical conducting pattern in a thin film of tin oxide deposited on a ceramic substrate, including the steps of masking the tin oxide over those portions making up the predetermined pattern, with the remainder of the thin film being exposed at the outside surface thereof, immersing said ceramic substrate with the film thereon in a bath comprising an amalgam of mercury and a reducing metal selected from the group consisting of the alkali metals and the alkaline earth metals to remove said remainder portion of the thin film, and removing the mask to leave exposed the tin oxide in the predetermined pattern on the ceramic substrate.

2. The process defined in claim 1 wherein the ceramic substrate is glass.

3. In a process for making a device which has a predetermined electrical conducting portion in a thin film of tin oxide deposited on a ceramic substrate with the outside surface of the tin oxide masked over a predetermined portion thereof, the step of removing the tin oxide film over the unmasked portion thereof by immersing the substrate with the tin oxide film thereon in a bath comprising, a pool of mercury having a supernatant aqueous solution of an ionizable compound of a reducing metal selected from the group consisting of the alkali metals and the alkaline earth metals, and with electrolysis taking place in the bath between an anode in the said solution and a cathode in the mercury pool, removing the substrate from the bath, and removing the mask from the tin oxide surface to provide a device wherein the tin oxide portion on the substrate is capable of carrying an electrical current therethrough.

References Cited by the Examiner

UNITED STATES PATENTS

| | | | |
|---|---|---|---|
| 1,200,025 | 10/16 | Reed | 204—130 |
| 1,922,975 | 8/33 | Nightingall | 204—221 XR |
| 2,435,889 | 2/48 | Kerridge | 156—8 |
| 2,823,148 | 2/58 | Pankove | 148—1.5 |
| 2,884,313 | 4/59 | Browne | 204—130 |
| 3,095,340 | 6/63 | Triller | 156—17 XR |

ALEXANDER WYMAN, *Primary Examiner.*

EARL M. BERGERT, JACOB STEINBERG, *Examiners.*